US006360640B1

(12) United States Patent
Cote

(10) Patent No.: US 6,360,640 B1
(45) Date of Patent: Mar. 26, 2002

(54) VARIABLE VELOCITY CUTTING CYLINDERS

(75) Inventor: Kevin Lauren Cote, Durham, NH (US)

(73) Assignee: Heidelberger Druckmaschinen, Heidelberg (DE)

( * ) Notice: Subject to any disclaimer, the term of this patent is extended or adjusted under 35 U.S.C. 154(b) by 0 days.

(21) Appl. No.: 09/352,253

(22) Filed: Jul. 13, 1999

(51) Int. Cl.$^{7}$ .................................... B23Q 15/12

(52) U.S. Cl. .................... 83/287; 83/286; 83/295; 83/311

(58) Field of Search .................... 83/286, 287, 288, 83/295, 296, 311, 298

(56) References Cited

U.S. PATENT DOCUMENTS

| | | | | | |
|---|---|---|---|---|---|
| 2,947,184 | A | * | 8/1960 | Olson | 83/286 |
| 3,614,572 | A | * | 10/1971 | Usher | 318/396 |
| 3,832,926 | A | * | 9/1974 | Leaseburge et al. | 83/311 |
| 4,103,575 | A | * | 8/1978 | Utsui et al. | 83/298 |
| 4,165,665 | A | * | 8/1979 | Shimizu et al. | 83/287 |
| 4,255,998 | A | * | 3/1981 | Rudszinat | 83/298 |
| 4,283,975 | A | * | 8/1981 | Knoll | 83/76 |
| 4,399,727 | A | * | 8/1983 | Omori et al. | 83/345 |
| 4,512,225 | A | * | 4/1985 | Green | 83/38 |
| 4,543,863 | A | * | 10/1985 | Rader | 83/76 |
| 4,667,551 | A | * | 5/1987 | Kuromaru et al. | 83/72 |
| 4,724,732 | A | * | 2/1988 | Miyauchi et al. | 83/37 |
| 4,809,573 | A | * | 3/1989 | Welch | 83/37 |
| 5,103,703 | A | * | 4/1992 | Littleton | 83/155 |
| 5,184,533 | A | * | 2/1993 | Golicz | 83/24 |
| 5,611,246 | A | * | 3/1997 | Long et al. | 74/393 |
| 5,669,277 | A | * | 9/1997 | Perrone | 83/37 |
| 5,713,256 | A | * | 2/1998 | Keeny | 83/26 |
| 5,879,278 | A | * | 3/1999 | Cox | 493/67 |
| 5,899,128 | A | * | 5/1999 | Smithe et al. | 83/76 |
| 5,974,923 | A | * | 11/1999 | Rigby, Jr. et al. | 83/76 |

* cited by examiner

*Primary Examiner*—M. Rachuba
*Assistant Examiner*—Kim Ngoc Tran
(74) *Attorney, Agent, or Firm*—Herbert L. Lerner; Laurence A. Greenberg; Werner H. Stemer

(57) ABSTRACT

A ribbon is cut into signatures with a cutting cylinder having a fixed diameter and rotating at a variable angular velocity. During the cutting operation, the cutting cylinder rotates at an angular cutting velocity that is substantially equal to the constant velocity of the ribbon. The angular velocity of the cutting cylinder is varied between the cutting operations in order to cut signatures of a desired length. A cutting cylinder system is also provided.

5 Claims, 5 Drawing Sheets

VARIABLE VELOCITY CUTTING CYLINDERS

BACKGROUND OF THE INVENTION

Field of the Invention

The invention relates to a method of cutting a ribbon into signatures of a desired length and a corresponding cutting system.

In web-fed printing units it is necessary to cut a paper web, which is provided from a roll of paper, into single sheets. The paper web is also known as a ribbon, the sheets cut from the paper web are also called signatures. It is known to create signatures of different lengths with cutting cylinders having a fixed diameter by changing the velocity of the cutting cylinders relative to the velocity of the ribbon. A disadvantage of this technique results from the velocity difference between the cutting cylinder and the ribbon. With this technique, the circumferential velocity of the cutting cylinder must be equal to or greater than the velocity of the ribbon. If the circumferential velocity of the cutting cylinder is significantly greater than the velocity of the ribbon then the quality of the cut declines.

The transportation velocity of the signatures after the cut is related to the circumferential velocity of the cutting cylinders. As the circumferential velocity of the cutting cylinders increases relative to the velocity of the ribbon, the velocity of the signatures must also increase relative to the velocity of the ribbon. This situation requires that the signatures be accelerated to the new, higher velocity. The acceleration of the signatures can cause an inconsistency in the position of the signatures. This inconsistency in signature position can cause problems with the quality of the signatures and the performance of the cutting system and consequently with the performance of an entire printing unit.

From the article "Goss exhibits futuristic concept press" by Gerry Valerio, it is also known to use a removable, seamless shell on a cutting cylinder in order to achieve a variable cutoff. The cutoff is changed by removing one shell from the cutting cylinder and installing another thicker or thinner shell. In order to compensate for the adjustments in the cylinder diameters, the center diameters of the cylinders have to be adjusted too.

SUMMARY OF THE INVENTION

It is accordingly an object of the invention to provide a method of cutting a ribbon as well as a cutting cylinder system which overcome the above-mentioned disadvantages of the heretofore-known methods and systems of this general type and which allow cutting signatures of different lengths without having to adjust the diameter of the cutting cylinder and which provide a good signature quality.

With the foregoing and other objects in view there is provided, in accordance with the invention, a method of cutting a ribbon, which comprises:

- providing a cutting cylinder having a fixed diameter and rotating at an angular velocity;
- providing a ribbon travelling at a constant velocity;
- cutting the ribbon into signatures of a desired length with the cutting cylinder rotating at an angular cutting velocity determined by the constant velocity; and
- changing the angular velocity of the cutting cylinder after the step of cutting in dependence of the desired length.

A ribbon is defined as any sheet-type or strip-type material, such as a paper web. A signature is defined as any part that is cut from the ribbon, such as a sheet of paper.

In accordance with another mode of the invention, the step of changing the angular velocity includes providing a mean angular velocity of the cutting cylinder which results in a circumferential velocity of the cutting cylinder that is either faster or slower than the constant velocity.

In accordance with a further mode of the invention, the angular cutting velocity is determined with the equation $$W_{cut} = \frac{2\cdot\pi\cdot V}{L}$$

with $W_{cut}$ being the angular cutting velocity, L being the desired signature length, and V being the constant velocity of the ribbon.

In accordance with yet a further mode of the invention, a mating anvil cylinder rotating in synchronism with the cutting cylinder is provided.

In accordance with another mode of the invention, the step of changing the angular velocity of the cutting cylinder includes controlling the angular velocity of the cutting cylinder with the equation $$W = \frac{2\cdot\pi\cdot V\cdot(L-N)}{N\cdot L}\cdot\cos\left(\frac{2\cdot\pi\cdot V}{L}\cdot t\right)+\frac{2\cdot\pi\cdot V}{L}$$

with W being the angular velocity of cutting cylinder, V being the constant velocity of the ribbon, L being the desired length of the signatures, N being a nominal signature length, and t being time.

With the objects of the invention in view there is also provided, a cutting cylinder system, comprising:

- a cutting cylinder having a fixed diameter and rotating at an angular velocity for cutting a ribbon travelling at a constant velocity into signatures having a desired length;
- a control device operatively connected to the cutting cylinder for controlling the angular velocity;
- the cutting cylinder rotating at an angular cutting velocity during cutting operations, the angular cutting velocity determined by the constant velocity, and the cutting cylinder having a mean angular velocity different from the angular cutting velocity.

In accordance with another feature of the invention, the control device determines the angular cutting velocity with the equation $$W_{cut} = \frac{2\cdot\pi\cdot V}{L}$$

with $W_{cut}$ being the angular cutting velocity, L being the desired signature length, and V being the constant velocity of the ribbon.

In accordance with yet another feature of the invention, the control device determines the angular velocity with the equation $$W = \frac{2\cdot\pi\cdot V\cdot(L-N)}{N\cdot L}\cdot\cos\left(\frac{2\cdot\pi\cdot V}{L}\cdot t\right)+\frac{2\cdot\pi\cdot V}{L}$$

with W being the angular velocity of the cutting cylinder, V being the constant velocity of the ribbon, L being the desired length of the signatures, N being a nominal signature length, and t being time.

In accordance with a further feature of the invention, the cutting cylinder system further includes a mating anvil cylinder rotating in synchronism with the cutting cylinder.

In accordance with yet a further feature of the invention, the cutting cylinder system further comprises a variable speed motor for driving the cutting cylinder and the anvil cylinder, the control device controlling the motor.

In accordance with another feature of the invention, the cutting cylinder system further comprises a first variable speed motor driving the cutting cylinder and a second variable speed motor driving the anvil cylinder, the control device controlling the first and the second variable speed motor.

In accordance with yet another feature of the invention, the cutting cylinder system further comprises a mechanical linkage connecting the cutting cylinder and the anvil cylinder.

In accordance with the invention, the velocity of the cutting cylinder varies as it rotates such that the angular velocity of the cutting cylinder is a function of the angular position of the cutting cylinders, the desired signature length, and the velocity of the ribbon.

Other features which are considered as characteristic for the invention are set forth in the appended claims.

Although the invention is illustrated and described herein as embodied in a method of cutting a ribbon and a cutting cylinder system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
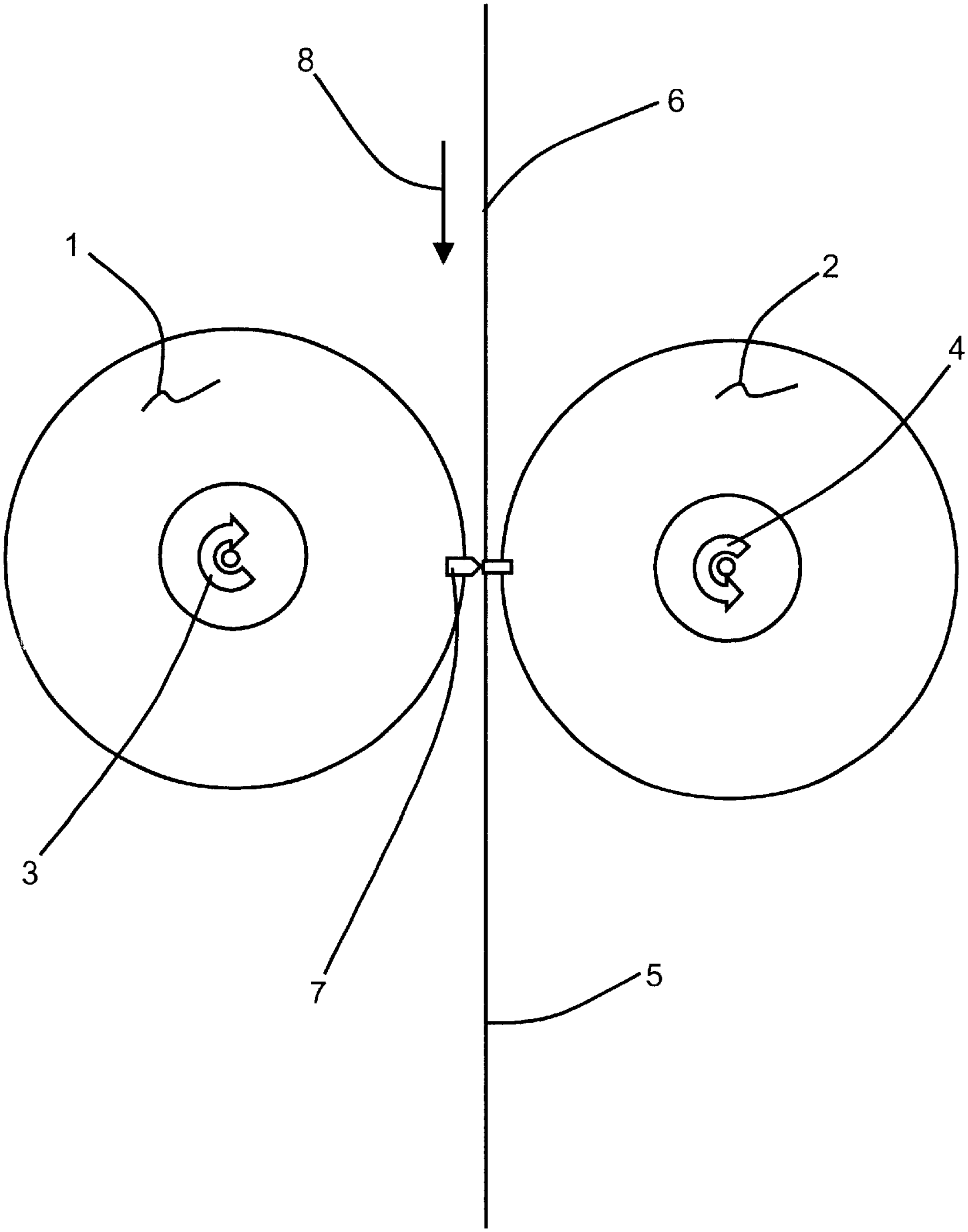
FIG. 1 is a diagrammatic side-elevational view of a cutting cylinder system during a cutting operation.

Referring now to the figures of the drawings in detail and first, particularly, to FIG. 1 thereof, there is shown a diagrammatic side-elevational view of a cutting cylinder 1 and a mating anvil cylinder 2. The cutting cylinder 1 and the anvil cylinder 2 follow the same velocity profile in all situations with opposite directions of rotation as indicated by arrows 3 and 4. The cutting cylinder 1 is shown at a position in the cycle where a signature 5 is just being cut from a ribbon 6. At this position the tangential velocity of a knife 7 is equal to the velocity of the ribbon 6 which is indicated by arrow 8.

Figure 2:
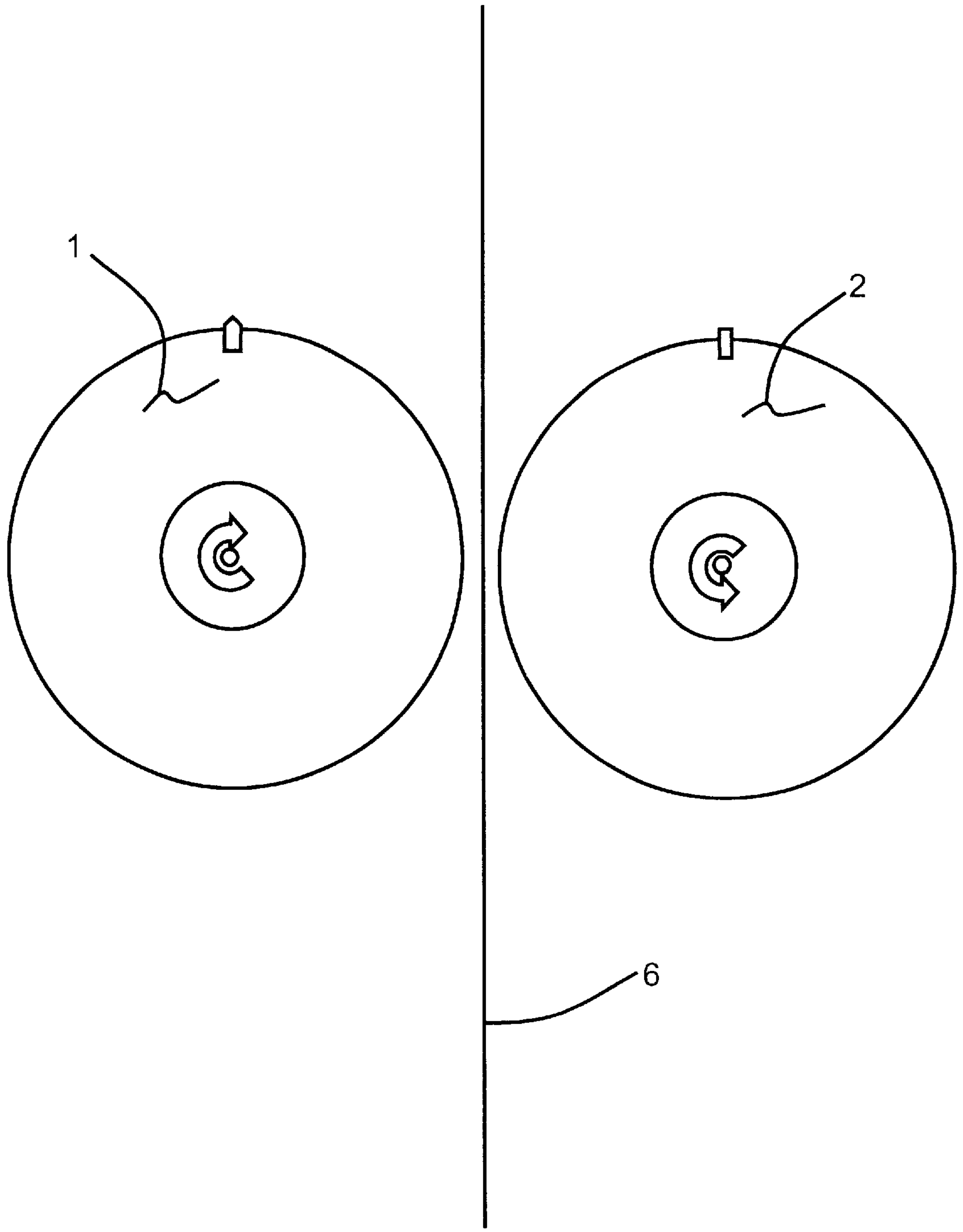
FIG. 2 is a diagrammatic side-elevational view of the cutting cylinder system in a non-cutting phase.

FIG. 2 shows the ribbon 6 travelling past the cutting cylinder 1 and the mating anvil cylinder 2 in a non-cutting phase of the cylinder cycle. In this non-cutting phase of the cylinder cycle the cutting cylinder 1 can have a circumferential velocity that is different from the velocity of the ribbon 6.

The steps of the operation of the cutting cylinder system are explained in the following. In a first step, the optimum velocity of the cutting cylinder 1 and of the anvil cylinder 2 relative to the ribbon 6 is determined. Then, a cutting cylinder velocity profile algorithm is determined so that all signature lengths are created by cutting the ribbon at the optimum cutting cylinder velocity. The cutting cylinder velocity profile algorithm must allow for the signature length to be a variable. Also, the cutting cylinder velocity profile algorithm tracks the velocity of the ribbon.

This strategy for cutting variable length signatures from a ribbon 6 that is travelling at a constant velocity can be separated into three categories.

Category 1:

The desired signature length equals the circumference of the cutting cylinder from knife 7 to knife 7. This is considered the nominal case where the cutting cylinder 1 and the anvil cylinder 2 rotate at a constant angular velocity relative to the ribbon 6.

Category 2:

The desired signature length is longer than the circumference of the cutting cylinder 1 from knife 7 to knife 7. In this case, the cutting cylinder 1 and the anvil cylinder 2 must slow down after cutting the ribbon 6 at the optimum velocity relative to the ribbon 6 to allow more of the ribbon 6 to pass than did in the nominal case.

Category 3:

The desired signature length is shorter than the circumference of the cutting cylinder from knife to knife. In this case, the cutting cylinder must increase velocity after cutting the ribbon at the optimum velocity relative to the ribbon so that less of the ribbon passes than did in the nominal case.

The following example is intended to illustrate the operation of the invention. In this example a cutting cylinder of a fixed diameter of 156.608 millimeters is used to create variable length signatures from a ribbon that is travelling at a constant velocity of 15.24 meters per second.

The goal is to cut the ribbon when the knife is travelling at the same velocity as the ribbon. For this example, the cutting cylinder must be rotating at 194.625 radians per second when the cut occurs.

Three different length signatures will be cut from the ribbon. Since the ribbon is traveling at a constant velocity the number of signatures created per second is a function of the length of the signature. The shorter the signature is the more signatures are created per second.

Case 1)

Signature length=492 mm

Signatures per second=30.976

The cutting cylinder circumference is 492 mm so in this case the cutting cylinder will rotate at a constant angular velocity of 194.625 radians per second.

Case 2)

Signature length=620 mm

Signatures per second=24.581

In this case the velocity of the cutting cylinder changes as the cutting cylinder rotates. The velocity profile has the following characteristics:

a) The angular velocity of the cutting cylinder equals 194.625 radians per second when the knife is cutting the ribbon.

b) The cutting cylinder slows to a lower angular velocity after the cut.

c) The ribbon velocity is greater than the tangential (circumferential) velocity of the knife during this phase of the velocity cycle.

d) The cutting cylinder increases its angular velocity to 194.625 radians per second as the knife comes around to cut the ribbon again.

e) The knife cuts the ribbon at the required frequency of 24.581 cuts per second.

f) The length of ribbon that passes by the cutting cylinder between cuts is 620 mm.

Case 3)

Signature length=364 mm

Signatures per second=41.868

In this case the velocity of the cutting cylinder changes as the cutting cylinder rotates. The velocity profile has the following characteristics:

a) The angular velocity of the cutting cylinder equals 194.625 radians per second when the knife is cutting the ribbon.

b) The cutting cylinder increases its angular velocity after the cut.

c) The ribbon velocity is slower than the tangential velocity of the knife during this phase of the velocity profile.

d) The cutting cylinder decreases its angular velocity to 194.265 radians per second again as the knife comes around to cut the ribbon again.

e) The knife cuts the ribbon at the required frequency of 41.868 cuts per second.

f) The length of ribbon that passes by the cutting cylinder between cuts is 364 mm.

A general algorithm for the control of the cutting cylinders is:

$$W = \frac{2\cdot\pi\cdot V\cdot(L-N)}{N\cdot L}\cdot\cos\left(\frac{2\cdot\pi\cdot V}{L}\cdot t\right)+\frac{2\cdot\pi\cdot V}{L}$$

with

W=angular velocity of cutting cylinder (radians/second),

V=ribbon velocity (meters/second),

L=desired signature length (meters),

N=nominal signature length (meters), t=time (seconds).

The nominal signature length is the signature length that results when the cutting cylinder 1 and the anvil cylinder 2 rotate at a constant angular velocity relative to the ribbon.

Figure 3:
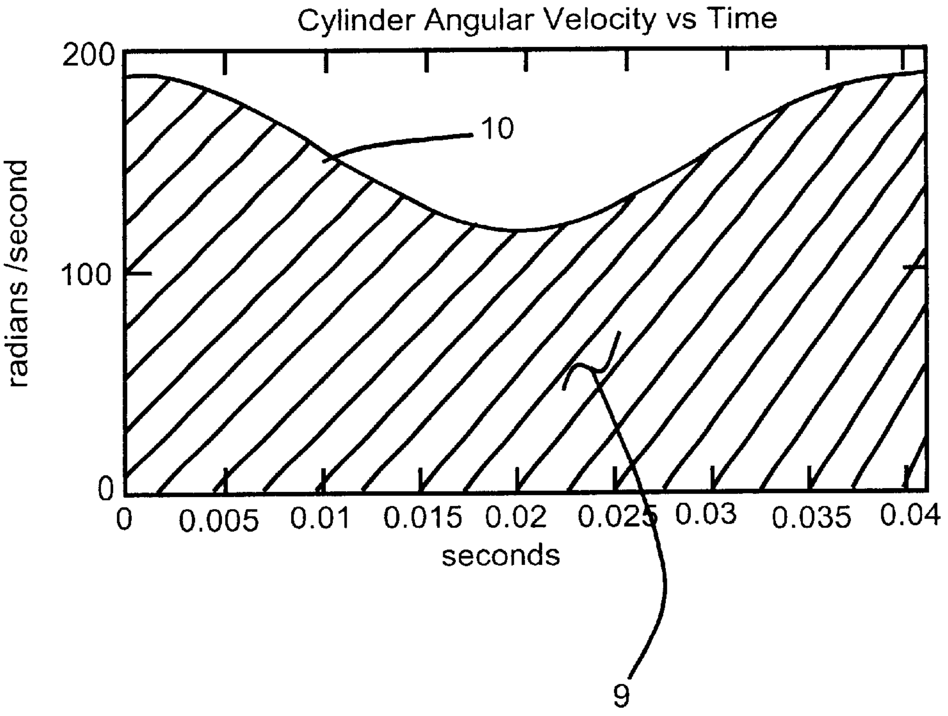
FIGS. 3 and 4 are velocity profiles of a cutting cylinder for producing signatures of different lengths.

FIG. 3 is a velocity profile of the angular velocity of the cutting cylinder 1 for case 2) described above. For this specific example the algorithm produces the velocity profile for the cutting cylinder shown in FIG. 3. The area 9 under the angular velocity curve 10 is equal to two pi radians. Using exemplary data, this would indicate that the cutting cylinder makes exactly one revolution every 0.041 seconds, therefore cutting 620 mm signatures at a frequency of 24.581 signatures per second from a ribbon that is travelling at a constant velocity of 15.24 meters per second. The angular velocity of cylinder would be 40.181·cos (154.445·t)+154.445 radians per second.

Figure 4:
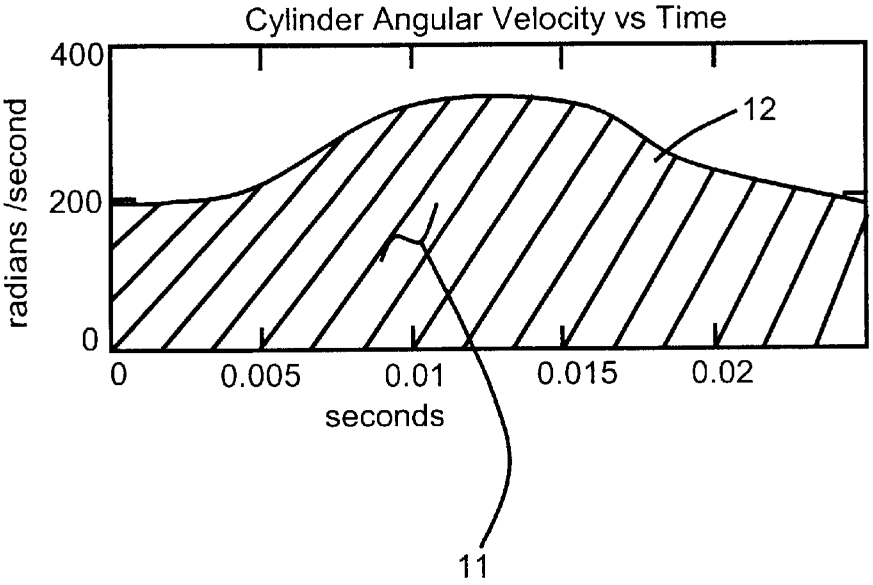

FIG. 4 is a velocity profile of the angular velocity of the cutting cylinder 1 for case 3) described above. The area 11 under the angular velocity curve 12 is equal to two pi radians. This indicates that the cutting cylinder makes exactly one revolution every 0.024 seconds, therefore cutting 364 mm signatures at a frequency of 41.868 signatures per second from a ribbon that is travelling at a constant velocity of 15.24 meters per second. The angular velocity with these exemplary data is −68.44·cos(263.065·t)+263.065 radians per second.

In a preferred embodiment, the described velocity profile can be generated by control of a variable speed motor 16 that drives the cutting cylinder 1 and mating anvil cylinder 2. The algorithm can be embedded in the controller for the variable speed motor.

Other velocity profile algorithms than the one described above may be used to satisfy specific requirements. Any velocity profile that enables the cutting cylinder to cut the ribbon at the optimum velocity and cut the signatures at the desired length and frequency may be used. Alternatively, the velocity of the cutting cylinder can be controlled in a manner other than described above.

Figure 5:
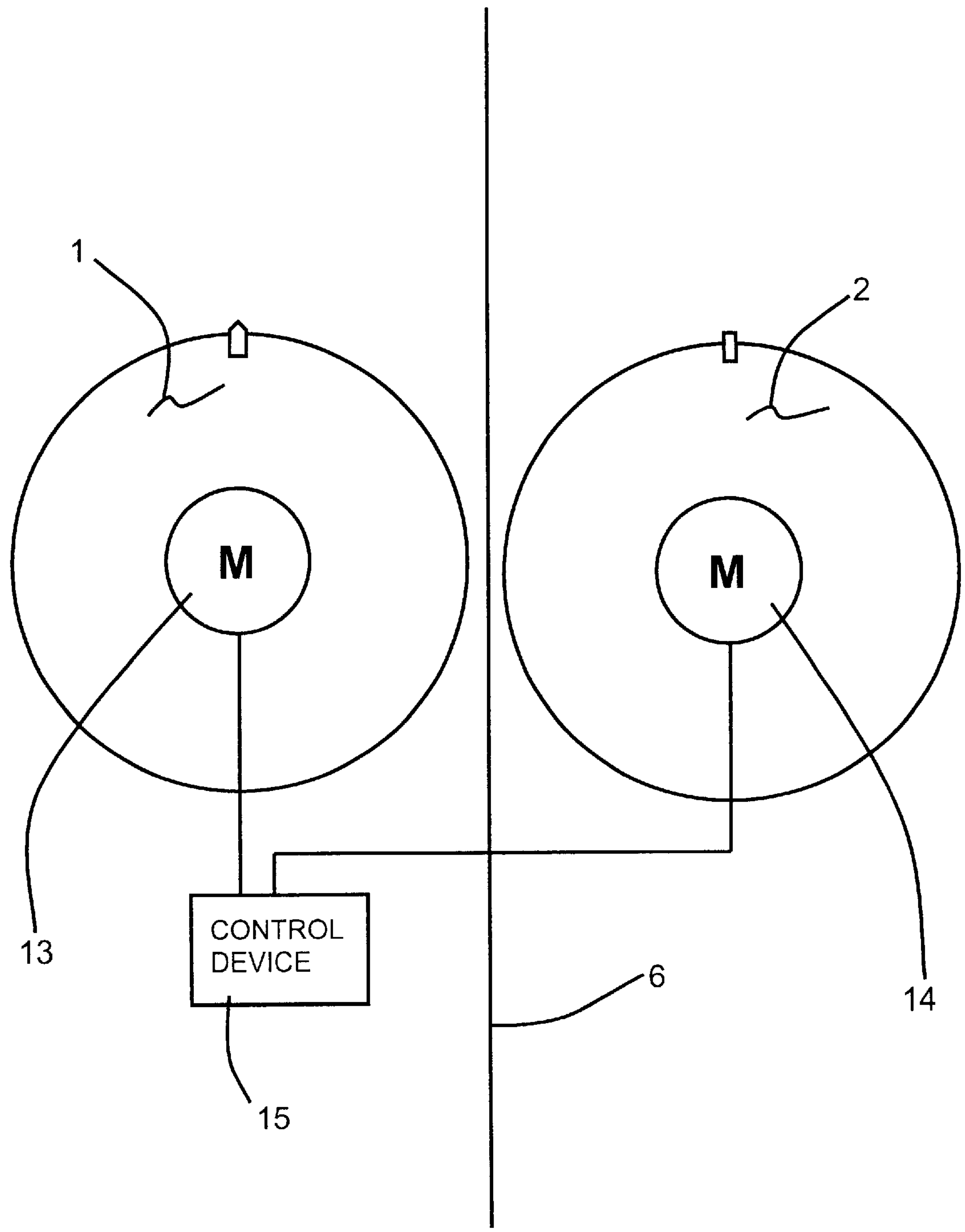
FIG. 5 is a diagrammatic side-elevational view of a cutting cylinder system according to the invention having a motor for each cylinder.
Figure 6:
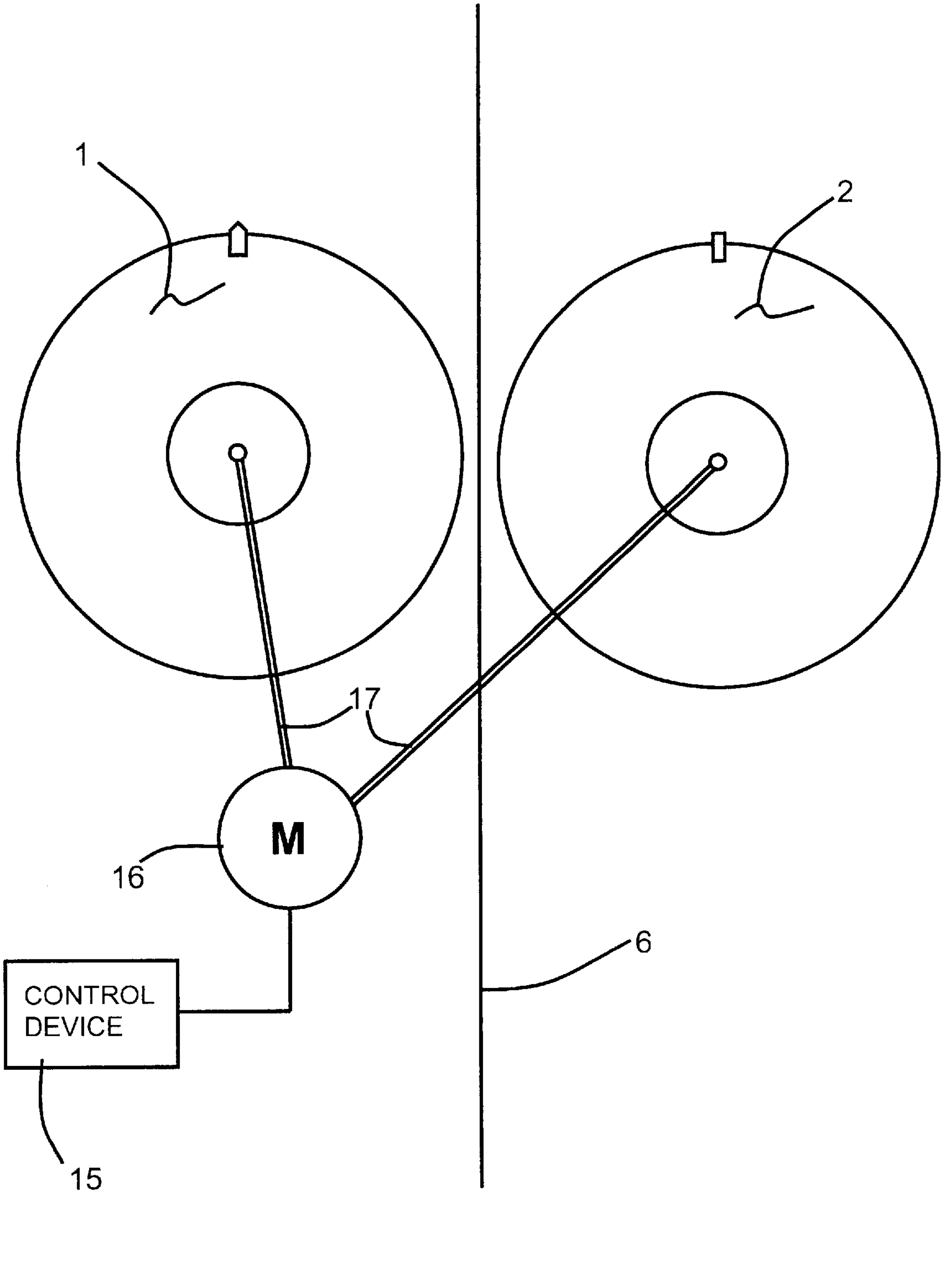
FIG. 6 is a diagrammatic side-elevational view of a cutting cylinder system according to the invention with a mechanical linkage for controlling the cylinders.

FIG. 5 illustrates an embodiment of the cutting cylinder system having a motor 13 for driving the cutting cylinder 1 and a motor 14 for driving the anvil cylinder 2. A control device 15 controls the two motors 13, 14. FIG. 6 illustrates an embodiment of the invention that uses a single motor 16. The cutting cylinder 1 and the anvil cylinder 2 are mechanically controlled trough linkages 17.

I claim:

1. A method of cutting a ribbon, which comprises:

providing a cutting cylinder having a fixed diameter and rotating at an angular velocity;

providing a ribbon travelling at a constant velocity;

cutting the ribbon into signatures of a desired length with the cutting cylinder rotating at an angular cutting velocity determined by the constant velocity; and changing the angular velocity of the cutting cylinder after the step of cutting in dependence on the equation $$W = \frac{2\cdot\pi\cdot V\cdot(L-N)}{N\cdot L}\cdot\cos\left(\frac{2\cdot\pi\cdot V}{L}\cdot t\right)+\frac{2\cdot\pi\cdot V}{L}$$

with W being the angular velocity of the cutting cylinder, V being the constant velocity of the ribbon, L being the desired length of the signatures, N being a nominal signature length, and t being time.

2. The method according to claim 1, wherein the step of changing the angular velocity includes providing a mean angular velocity of the cutting cylinder which results in a circumferential velocity of the cutting cylinder that is faster than the constant velocity.

3. The method according to claim 1, wherein the step of changing the angular velocity includes providing a mean angular velocity of the cutting cylinder which results in a circumferential velocity of the cutting cylinder that is slower than the constant velocity.

4. The method according to claim 1, which comprises determining the angular cutting velocity with the equation $$W_{cut} = \frac{2\cdot\pi\cdot V}{L}$$

with $W_{cut}$ being the angular cutting velocity, L being the desired signature length, and V being the constant velocity of the ribbon.

5. The method according to claim 1, which comprises providing a mating anvil cylinder rotating in synchronism with the cutting cylinder.

* * * * *